(12) United States Patent
Caruana et al.

(10) Patent No.: US 7,928,918 B2
(45) Date of Patent: Apr. 19, 2011

(54) ADJUSTING RESONANCE FREQUENCY BY ADJUSTING DISTRIBUTED INTER-TURN CAPACITY

(75) Inventors: Jean-Paul Caruana, Marseilles (FR); Frédérick Seban, Cassis (FR); Arek Buyukkalender, Marseilles (FR)

(73) Assignee: Gemalto SA, Meudon (FR)

( * ) Notice: Subject to any disclaimer, the term of this patent is extended or adjusted under 35 U.S.C. 154(b) by 538 days.

(21) Appl. No.: 12/065,289

(22) PCT Filed: Aug. 25, 2006

(86) PCT No.: PCT/EP2006/065671
§ 371 (c)(1),
(2), (4) Date: Feb. 29, 2008

(87) PCT Pub. No.: WO2007/025934
PCT Pub. Date: Mar. 8, 2007

(65) Prior Publication Data
US 2008/0198078 A1     Aug. 21, 2008

(30) Foreign Application Priority Data
Sep. 2, 2005  (FR) ..................................... 05 52663

(51) Int. Cl.
*H01Q 1/36* (2006.01)
*H01Q 9/00* (2006.01)
(52) U.S. Cl. ....................................... 343/745; 343/895
(58) Field of Classification Search .................. 343/895, 343/745, 749; 235/492, 493
See application file for complete search history.

(56) References Cited

U.S. PATENT DOCUMENTS

| | | | |
|---|---|---|---|
| 3,852,759 A  * | 12/1974 | Felsenheld et al. | 343/729 |
| 4,021,705 A | 5/1977 | Lichtblau | |
| 6,631,847 B1* | 10/2003 | Kasahara et al. | 235/487 |
| 7,334,734 B2 * | 2/2008 | Hino et al. | 235/492 |
| 2001/0011012 A1 | 8/2001 | Hino et al. | |
| 2004/0256468 A1* | 12/2004 | Akiho et al. | 235/492 |
| 2007/0138297 A1* | 6/2007 | Sickert et al. | 235/492 |

FOREIGN PATENT DOCUMENTS

| | | |
|---|---|---|
| DE | 101 13 476 (C1) | 4/2003 |
| EP | 0 992 940 (A2) | 4/2000 |
| EP | 1 298 578 (A1) | 4/2003 |

OTHER PUBLICATIONS

Form PCT/ISA/210 (International Search Report) dated Nov. 10, 2006.
Form PCT/ISA/237 (Written Opinion of the International Searching Authority) dated Nov. 10, 2006.

* cited by examiner

*Primary Examiner* — Tan Ho
(74) *Attorney, Agent, or Firm* — Buchanan Ingersoll & Rooney PC

(57) ABSTRACT

The invention concerns a method for adjusting frequency tuning of a resonant circuit with turns having a regular spacing generating stray inter-turn capacity. The adjusting of the frequency tuning of the resonant circuit is performed, at the level of the stray inter-turn capacity, by varying the regular spacing of adjacent turns on at least one zone of the antenna. The invention uses this adjusting method for producing an adjusted antenna for a resonant circuit, the resonant circuit and a non-contact product. The invention concerns a device programmed for antenna production and/or definition.

15 Claims, 1 Drawing Sheet

ADJUSTING RESONANCE FREQUENCY BY ADJUSTING DISTRIBUTED INTER-TURN CAPACITY

The invention relates to the field of the adjustment of frequency tuning of a resonant circuit, the structures of the resonant circuit and the products comprising such circuits.

More particularly, the invention relates to a method for producing an adjusted antenna for a resonant circuit, said antenna generating a distributed stray inter-turn capacity.

The aim of the invention is the use of the above-mentioned method for producing a non-contact smart card having a small size with very restrictive specifications.

Among the methods for adjusting the frequency tuning, methods are known which consist either in varying the value of the inductance of an antenna or the value of a capacity connected to the antenna, or both.

It is more particularly known to adjust a posteriori by adding or removing conductive material at the level of the antenna or the structures of the resonant circuit, or particularly by machining with for example a laser or adding material for example with a conductive ink jet.

In the field of non-contact cards or electronic labels, the capacity is generally obtained through the plates of a capacitor located on both sides of an isolating film on which a flat antenna having adjacent turns spaced from each other is positioned. The capacity can also be available in the form of an integrated circuit in an electronic chip connected to the antenna.

For high grade chip cards having extremely reproducible and performing characteristics, the utilisation of a wire antenna positioned in a body of a card made of plastic material by means of the technology of a wire embedded with ultrasonic probes is known.

Such conductive wires, generally made of copper, are very thin, of the order of 113 µm, and spaced by approximately 700 µm to build antenna turns, make it possible to obtain a high quality coefficient, for example over 44, contrary to antennas obtained by deposition of conductive material, more particularly by silk-screening with a conductive ink.

At present, there is a need for high quality non-contact chip mini-cards with a low cost, and more particularly bank mini-cards having dimensions lower than the standard ISO format of chip cards, and having electromagnetic characteristics which are equivalent to those of a non-contact ISO format card.

Now, new formats or various electric constraints limit the possibility of defining the shape of an antenna for a non-contact card complying with the standard ISO/IEC 14443. Thus, for example, new reduced formats of chip cards, more particularly 60×35 mm instead of 54×85 mm in dimensions, limit the possibilities of paths for the antenna wire.

Besides, the persons skilled in the art know how to adapt an antenna to the characteristics of an existing chip for cost considerations, by reusing more particularly a value of capacity embedded in the chip which does not necessarily correspond to the possible frequency tuning of the antenna.

The first general aim of the invention more particularly consists, through a new adjusting method, in bringing a new dimension to the existing degrees of freedom (or parameters) which can be acted upon to design a plane antenna for a non-contact electronic product such as a smart card.

Another aim of the invention, as an application of such method, is to answer, in a simple and efficient way, the need for a new format of a non-contact chip card, as mentioned above.

Therefore, the invention aims at a method making it possible to design, for a low cost, a plane antenna having very accurate and easily adjustable characteristics, which can comply with an existing integrated circuit component and with the geometrical constraints of the body of the chip card.

The main principle of the invention uses the phenomenon of distributed stray capacity inherent in an antenna coil, but not used today, as provided by the invention.

As a matter of fact, although the phenomenon of distributed stray capacity is known and probably considered very approximately when calculating the global capacity of an antenna circuit, because of its relatively low value, such parameter is not used, at least in the field of chip cards as an essential parameter to perform, a priori, a precise adjustment of the inductance of an antenna coil with a view to obtaining a frequency tuning required for the operation of a non-contact electronic product.

Thus, in application of such an adjusting principle, there is no antenna or resonant circuit comprising a partial antenna zone intended for or resulting from the adjustment of the inter-turn capacity.

Thus, the first aim of the invention is a method for adjusting the frequency tuning of a resonant circuit comprising turns having a regular spacing (e) generating a stray inter-turn capacity. The method for adjusting is innovative in that it includes a step of adjusting the stray inter-turn capacity by varying the regular spacing F, G, H, I of adjacent turns on at least a partial zone B of the antenna 1.

Another aim of the invention is also a method for producing an adjusted antenna for a resonant circuit, said antenna having at least a first zone comprising turns having a determined regular spacing.

It is also innovative in that, a greater regular spacing than the determined regular spacing of the turns is performed on a second zone of the antenna, also called the adjustment zone.

According to other embodiments of the method of the invention for producing an antenna:
- the adjustment zone of the stray capacity extends on a minimum part of its perimeter;
- the minimum part is lower than approximately a quarter of its perimeter;
- the diameter of turns is between 200 µm and 300 µm;
- the spacing of turns in the adjustment area is about approximately 2 mm, the regular spacing of the turns in the first zone being lower than approximately 1 mm;
- the inter-turn spacing in the adjustment zone is equal to approximately 3.5 mm for the 3 outer turns and equal to approximately 2.5 mm for the 3 inner turns;
- the adjustment zone is substantially inscribed in a rectangle of the order of 35×12 mm, the antenna being inscribed in a zone of the order of 60×35 mm.

Another object of the invention is a method for producing a resonant circuit, said resonant circuit comprising a capacity associated with one antenna. The method is innovative in that said capacity or an adjustment of the frequency tuning of the capacity is obtained by making said antenna according to one of the above characteristics.

Another aim of the invention also is an adjusted antenna for a resonant circuit, said antenna having at least the first zone A comprising turns having a predetermined regular spacing.

The antenna is innovative in that it comprises turns having an inter-turn spacing which is different from the predetermined regular spacing, on at least a second partial zone, also called the adjustment zone.

Another object of the invention is also a resonant circuit comprising at least a capacity associated with an antenna. It is innovative in that it comprises the above antenna or the antenna obtained by the above-mentioned method.

Another object of the invention is a non-contact chip card comprising an antenna or a resonant circuit having the above characteristics.

Finally, another object of the invention is a programmed device for producing and/or defining an antenna, characterised in that it includes processing means and a program configured so as to determine inter-turn spacings in a partial zone of an antenna, as a function of a distributed inter-turn capacity.

Such a device would make it possible, for example, to vary within a controlled limit of the order of 3% (because of the small variation zone possible), the value of the distributed capacity of the antenna to adapt it, in real time, more particularly during the production of a non-contact product, to the natural variations of a batch of chips intended for a batch of antennas.

Other characteristics and advantages of the invention will appear clearly upon reading the description given as a non-limitative example and while referring to the appended drawings on which:

Figure 1:
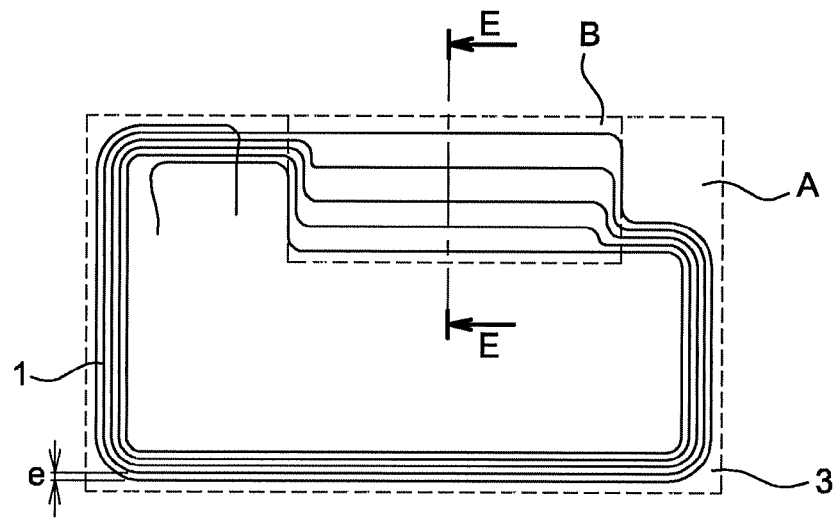
FIG. 1 illustrates an antenna produced according to an embodiment of the method of the invention.
Figure 2:
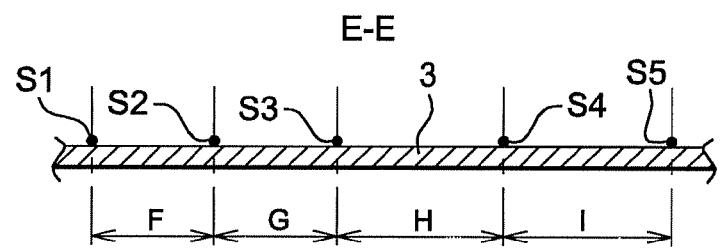
FIG. 2 illustrates a partial cross-section of FIG. 1 along E-E.

In FIG. 1, an adjusted antenna 1 for a mini resonant circuit 2 was produced on a support 3, more particularly a sheet of polymer material. The support product obtained, possibly intended to be assembled with other sheets as an insert or an electronic subassembly, is currently called "inlay" in English.

The antenna has a first zone A comprising 5 turns S1, S2, S3, S4, S5 having a determined regular spacing (e) at 700 μm. A regular spacing means a substantially constant spacing between the turns.

For reasons of implementation calculation and simplicity, the turns are generally positioned in parallel and spaced regularly from each other, but they also can have different spacings.

Thus, the invention may include alternative solutions in which the turns can have an irregular spacing. According to a preferred alternative, an inner turn can make a deviation with respect to a normal path. For example, an inner turn has at least a loop or a wave extending inside the surface of its support while going away from the adjacent turn. The adjacent turn can follow such wave with a less important amplitude.

For a computer program controlling any device or defining an antenna, it is possible to integrate the effect produced on the inter-turn capacity for a calibrated wave and to multiply the number of waves on the path of a turn until the expected effect is obtained.

In the example, the electric conductive wire is a copper wire with a plastic sheath which is simply fixed by the hand, for example by an adhesive, on the support.

According to other techniques, the wire could be embedded in a polymer support by ultrasounds or deposited on a sheet; such sheet may include fibres made of a cellulosic material.

According to the mode of implementation, an adjustment zone or portion is provided in a second zone of the antenna B. In such a zone, the spacing of the antenna turns is different from the spacing (e) of the turns in zone A. As a matter of fact, it is greater.

Because their diameter or surface is substantially equal to approximately twice the usual value, the turns of the zone A generate a stray capacity having a value greater than what is generally observed for smaller diameters. On the contrary, the turns of the adjustment zone generate a stray capacity having a value controlled and adjustable by means of a simple adjustment of the inter-turn spacing F, G, H, I.

According to a preferred characteristic, the adjustment zone B of the stray capacity extends on a partial part of its parameter. The partial part is smaller than approximately a quarter of the antenna parameter, since it extends from the location of the electronic chip module to the right side edge of the support.

As a matter of fact, the applicant found out that an adjustment zone distributed over the whole parameter of the antenna would not make it possible to operate correctly the resulting transponder.

The applicant also found out that better results were obtained with an adjustment zone having only one continuous length or in only one piece, rather than having, for example, another separate adjusting zone in the lower edge of the support.

Accordingly, the adjustment zone more particularly concerns only one side of the antenna and is continuous; in the example, it is positioned on a longitudinal edge of the antenna.

The invention takes advantage of the properties of the lead wire, in fact copper, the diameter of which is non-negligible (generally equal to 113 μm for this type of chip card) behaves between the non-adjacent turns like two capacitor structure surfaces opposite each other. The preferred diameter of the turns is between 200 μm and 300 μm, so as to increase such surface opposite and the resulting capacity effect. In the example, the diameter is equal to approximately 250 μm.

Two opposite surfaces of turns can be compared to two conductive plates separated by an isolating material having a thickness d. The turns accumulate electric charges like capacitor plates when they are submitted to a magnetic field. The difference in load between said plates separated by a distance "d" results in the occurrence of a capacity distributed along the profile formed by the antenna turns.

The value of the capacity is defined by the following equation:

$$C=U/d,$$

U corresponding to the difference of potential between said plates or turns, d being the distance between them.

The spacing between turns in the adjustment zone is greater than approximately 2 mm, whereas the regular spacing of turns in the first zone is lower than approximately 1 mm.

In another embodiment, the inter-turn spacing in the adjustment zone is equal to approximately 3.5 mm for the 3 outer turns (S3, S4, S5) and equal to approximately 2.5 mm for the 3 inner turns (S1, S2, S3).

According to another particularly adjusted example, the following spacing values between adjacent turns (S1, S2, S3, S4, S5) can be found from left to right in the Figure: 2.58 mm; 3.09 mm; 3.74 mm, 3.28 mm.

The invention takes advantage of the physical property mentioned above, by defining a particular zone of the antenna positioned on only one side of the antenna. In this area, the spacing of the turns is enhanced for adjusting the final characteristic of the antenna.

The combination of the wire diameter with the width of the particular zone which determines the difference in potential and the distributed spacing between the turns makes it possible to reach the objective characteristics of the antenna.

Such characteristics include a high quality coefficient, a whole number of turns and a surface scanned by the maximum turns according to the constraints of the chip card.

The spacing of the turns located on the outside of the support is greater than that of the turns positioned on the inside of the support or the antenna coil.

It should be noted that there is not only a stray capacity between two adjacent turns but also between non-adjacent turns, which adds some difficulty to the resorting to, and mastering of such parameter.

The adjustment zone is substantially inscribed in a rectangle of the order of 35×12mm, the antenna being inscribed in a zone C=A+B of the order of 60×35mm.

Figure 3:
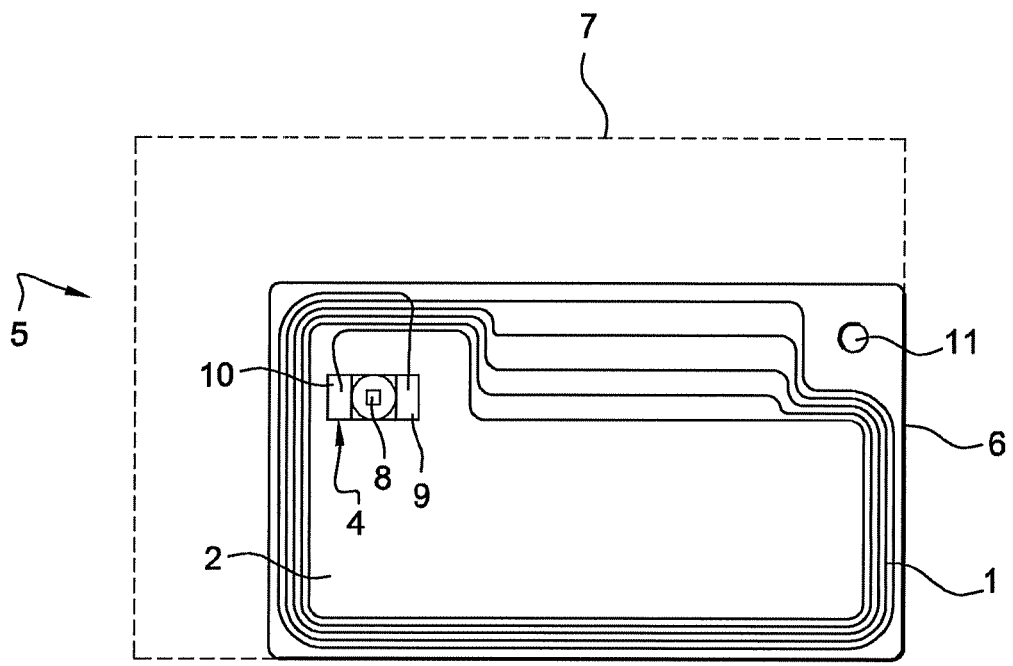
FIG. 3 illustrates a non-contact product according to one embodiment of the method of the invention.

In FIG. 3, the embodiment of a resonant circuit 2, for a non-contact product includes a step of connecting the antenna 1, as previously mentioned, to an electronic module 4.

The connection can be made on the inlay then this inlay can be used as such or can be submitted to other steps of finishing such as a lamination of covering and/or decoration sheets to form a non-contact chip card with an antenna 5, or even of a contact or non-contact type with a specific module having contact pads flush with the surface of the card body, in addition to the contacts 9, 10 for the connection to the antenna.

The format of the mini card 6 is smaller than that of the ISO card 7 from which it can be obtained, more particularly because it can be detached by means of a pre-cut along its profile. In the example, the mini card has an eyelet 11 for a key chain, which adds some complexity in the path of an antenna for a small size transponder which must be seen by a reader like a large size ISO transponder.

The electronic module preferably includes an integrated capacitor in an electronic chip 8 and the resonant circuit comprises a capacity associated with an antenna. For reasons of excessive cost of double face type supports, having metal plates on each face, the capacity of the resonant circuit is not provided by such plates.

The aim of the invention is to minimize the costs by using a standard chip already having a capacity value and by only acting on the antenna through the inherent capacity of the antenna to obtain the expected frequency tuning and some other technical criteria.

Thus, a resulting capacity, such as expected, or a frequency tuning adjustment of the total capacity is obtained by producing said antenna according to the above embodiment.

The method or process for adjusting the frequency tuning of the above resonant circuit is thus mainly performed at the level of the stray inter-turn capacity by acting on the spacing of turns, in fact through the increase or reduction of the normal inter-turn space (e) on at least one zone of the antenna. It should be noted that all the turns have a widened inter-turn spacing in this zone. However, it should not be excluded to have some turns with a non-widened space, adjacent to turns having a widened spacing.

The adjustment method is all the more sensitive since the inter-turn spacing varies, for example by a factor greater than at least 2, or even 5. In the example, the variation of the spacing is greater than a factor 10.

The resonant circuit 2 comprises at least one capacity associated with one antenna and includes the antenna resulting from the method or obtained by applying the adjustment method or process mentioned above.

Such method applied to the production of a small size card of the "mini bank card" type 6, gives results according to the expected resonant frequency Fo of the electronic product of 20 Mhz:

total area of the antenna: the antenna is inscribed in a rectangle, 60×35 mm in dimensions 5 turns an electronic chip executing non-contact communication functions has an internal capacity of adjustment of 27 pico farad.

the value of the inductance of the antenna to reach this aim is 2.34 µH

In order to facilitate the use of such method for adjusting the capacity or obtaining optimum results, the invention can use a computer program for example connected to a drawing table or to a development and/or creation system of an antenna geometry or any device for aiding in the design or the execution of the antenna, for example.

Such program can implement, with the help of processing means, steps of the method of the above-mentioned invention. It can be developed from calculation rules making it possible to reach at least a more accurate or optimal definition of the inter-turn deviation and of the length of the adjustment zone.

The definition can occur more particularly as a function of the geometric parameters or electric constraints defined hereabove. The program would make it possible to take into account the influence of non-adjacent turns as a function of their diameter. The processing means and the program can be so configured as to determine inter-turn spacings in a partial zone of the antenna as a function of a resulting distributed inter-turn capacity.

By comparison, to reach such value according to the teachings of the prior art, the spacing required between the turns amounting to 115 µm should have been 1.12 mm. This creates a surface scanned by the antenna of 8522 mm$^2$ in dimensions and has a quality factor of 81.

With the invention, the total area of the antenna: the antenna is inscribed in a rectangle 60×35 mm in dimensions
the diameter of the wire is 250 µm, 25 µm of which is the isolating material.
the spacing between the turns, out of the adjustment zone is 700 µm.
the dimensions of the adjustment zone: it is inscribed in a rectangle 35×12 mm in dimensions.

This creates a surface scanned by the antenna of: 9285 mm$^2$ and a quality factor of the antenna, in an unloaded condition, of 93.

The difference between an embodiment of the prior art and an embodiment complying with the invention amounts to 8% of additional surface and above all an antenna quality factor which is greater by 15%.

In the example, considering the small engaged surfaces, the non-contact product complying with the invention can be operated, whereas it would not operate with any geometry of antenna built with the same wire and the turns of which would be regularly spaced on its entire perimeter.

The invention claimed is:

1. A method for adjusting frequency tuning of a resonant circuit, the resonant circuit comprising a plurality of adjacent turns having a regular spacing that generate a stray inter-turn capacity, the plurality of adjacent turns defining a turns region, the method includes the steps of:
   determining spacing of one or more adjacent turns in a sub-region of the turns region to attain a stray inter-turn capacity associated with a specified frequency of the resonant circuit; and
   adjusting the stray inter-turn capacity by varying the regular spacing of the one or more adjacent turns in the sub-region of the turns region based on the determined spacing.

2. A method for producing an antenna for a resonant circuit, said antenna having at least one first zone comprising adjacent turns having a predetermined regular spacing, the method includes:
  determining spacing of two or more adjacent turns in a second adjustment zone to attain a stray inter-turn capacity associated with a specified frequency of the resonant circuit,
  wherein, on a second adjustment zone of the antenna, a spacing of the adjacent turns is made which is distinct from the predetermined regular spacing for the first zone of the adjacent turns based on the determined spacing.

3. A method for producing the antenna according to claim 2, wherein the second adjustment zone extends on a minimum part of a perimeter of the antenna.

4. A method for producing the antenna according to claim 3, wherein the minimum part is less than approximately a quarter of the perimeter.

5. A method for producing the antenna according to claim 2, wherein a diameter of the adjacent turns is between 200 µm and 300 µm.

6. A method for producing the antenna according to claim 2, wherein the inter-turn spacing in the adjustment zone is greater than approximately 2 mm, the regular spacing of the adjacent turns in the first zone being less than approximately 1 mm.

7. A method for producing the antenna according to claim 6, wherein the inter-turn spacing in the adjustment zone is equal to approximately 3.5 mm for three outer turns and equal to approximately 2.5 mm for three inner turns.

8. A method for producing an antenna according to claim 2, wherein the adjustment zone is substantially inscribed in a rectangle of an order of 35×12 mm, the antenna being inscribed in a zone of an order of 60×35 mm.

9. A method for producing the resonant circuit circuit, said resonant circuit comprising a capacity associated with said antenna,
  wherein said capacity or a frequency tuning adjustment of the capacity is obtained by producing said antenna according to claim 2.

10. A method for producing the antenna according to claim 2, wherein the turns form a sequence of adjacent turns including a first turn and a last turn of the sequence such that a spacing associated with one pair of the adjacent turns, which does not include the first turn or the last turn of the sequence, has a spacing that is largest among spacings of the adjacent turns of the sequence.

11. A method for producing the antenna according to claim 2, further including producing a first resonant circuit prior to the adjusting of the stray inter-turn capacity for a subsequent batch of resonant circuits for a production order of the batch of resonant circuits.

12. An adjusted antenna for a resonant circuit, said antenna having at least a first zone comprising turns having a predetermined regular spacing,
  wherein the antenna comprises on at least a second partial zone, the turns having an inter-turn spacing different from the predetermined regular spacing,
  wherein the turns form a sequence of adjacent turns including a first turn and a last turn of the sequence such that a spacing associated with one pair of the adjacent turns, which does not include the first turn or the last turn in the sequence, has a spacing that is largest among spacings of the adjacent turns of the sequence.

13. A resonant circuit comprising at least one capacity associated with an antenna, wherein said resonant circuit includes said antenna adjusted for the resonant circuit, said antenna having:
  at least one first zone comprising adjacent turns having a predetermined regular spacing, and
  a second zone having a spacing of the adjacent turns which is distinct from the predetermined regular spacing of the adjacent turns,
  wherein the adjacent turns form a sequence of the adjacent turns including a first turn and a last turn of the sequence such that a spacing associated with one pair of the adjacent turns, which does not include the first turn or the last turn in the sequence, has a spacing that is largest among spacings of the adjacent turns of the sequence.

14. A non-contact smart card comprising a resonant circuit with an antenna having an associated capacity, said antenna having:
  at least one first zone comprising adjacent turns having a predetermined regular spacing, and
  a second zone of the antenna having a spacing of adjacent turns which is distinct from the predetermined regular spacing of the adjacent turns of the first zone,
  wherein the adjacent turns form a sequence of the adjacent turns including a first turn and a last turn of the sequence such that a spacing associated with one pair of the adjacent turns, which does not include the first turn or the last turn in the sequence, has a spacing that is largest among spacings of the adjacent turns of the sequence.

15. A programmed device for the production and/or definition of an adjusted antenna for a resonant circuit, said antenna having at least a first zone comprising turns having a predetermined regular spacing and having a stray inter-turn capacity,
  wherein said programmed device includes processing means and a program configured so as to adjust the stray inter-turn capacity of the antenna by varying the regular spacing of adjacent turns on at least one partial zone of the antenna to generate the resonant circuit of a desired resonant frequency based on a stray inter-turn capacity deviation associated with the varied regular spacing.

* * * * *